UNITED STATES PATENT OFFICE.

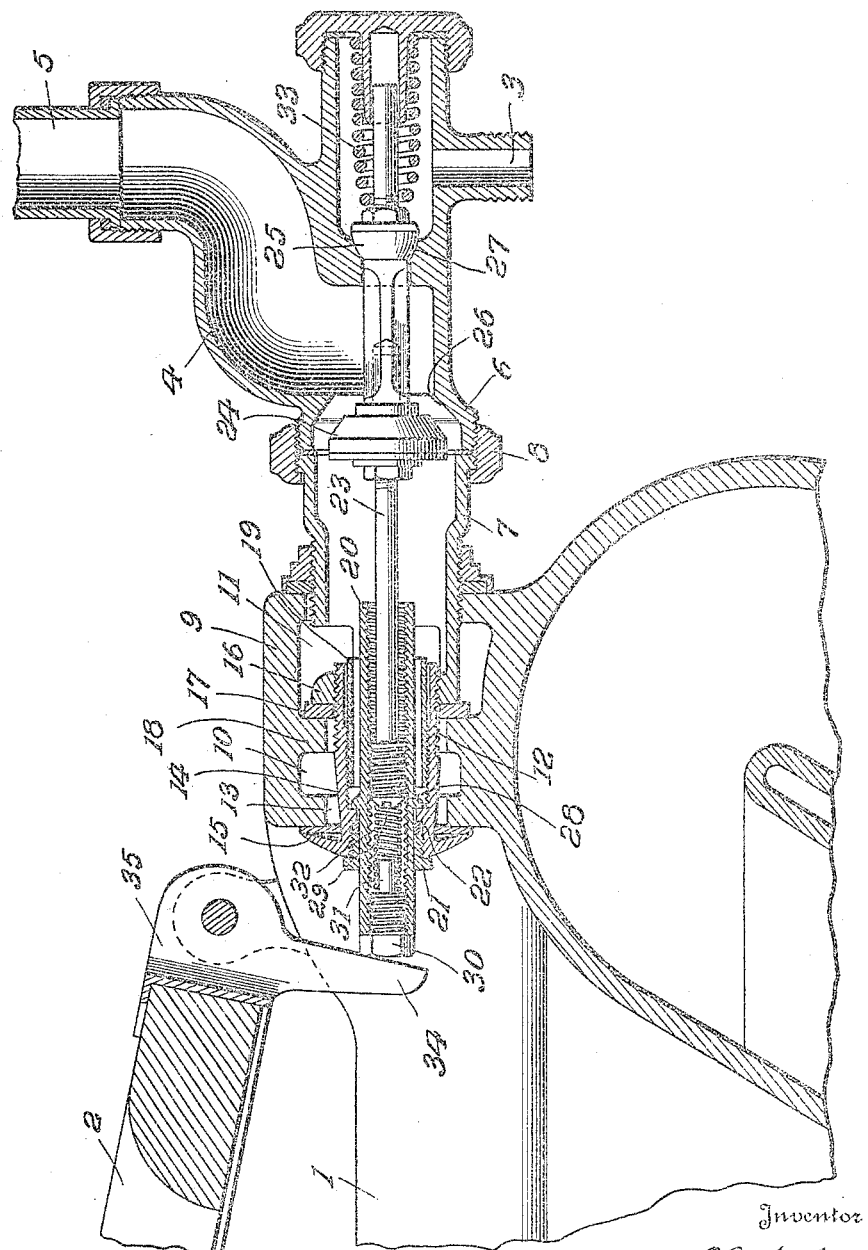

HARRY L. KELLY, OF WASHINGTON, DISTRICT OF COLUMBIA.

VALVE FOR FLUSHING SYSTEMS.

1,231,378. Specification of Letters Patent. Patented June 26, 1917.

Application filed September 27, 1916. Serial No. 122,424.

*To all whom it may concern:*

Be it known that I, HARRY L. KELLY, a citizen of the United States, residing at Washington, District of Columbia, have invented and discovered certain new and useful Improvements in Valves for Flushing Systems, of which the following is a specification.

The present invention relates to valves for flushing systems and consists in the combinations and arrangements of parts hereinafter described, and particularly set forth in the accompanying claims.

The invention has for its purpose to provide an automatically operable flushing valve that is adapted to be adjusted with respect to the valve seat without requiring the removal of any parts of the flushing system; and wherein the valve member will be securely held against displacement through the operation of the system.

The invention has for its further purpose to provide a flushing valve that is self-contained to the end that the same may be mounted as a unitary structure, and wherein the valve adjustment may be effected in an easily performed manner, and while the valve is in operative position.

The invention is shown by way of illustration in the accompanying drawing in which the figure is a vertical sectional view of the valve as applied to a flushing system.

Referring to the construction in further detail, 1 represents a bowl or tank, 2 the seat, 3 the water supply pipe, 4 the valve shell having communication with the flushing pipe 5 that leads to the pressure tank not shown. And, a threaded branch 6 connects with the pipe 7, by the coupling nut 8, with the portion 9 of the bowl. Said portion 9 provides the flushing channel 10 and wash-out channel 11, that communicates with the channel 10 through the openings 12. Similar openings 13 provide communication between the channel 10 and the bowl 1.

The foregoing described apparatus is of known construction and forms no part of the present invention, but is shown herein only for the purpose of illustrating one application of the present invention.

A hollow bushing 14 formed with an external flange 15 is secured within the portion 9 of the bowl by means of the portion 16 of the pipe section or sleeve 7, and an elastic packing 17 is interposed between said portion 16 and the web 18 of the part 9.

A sleeve 19 is screw-threaded within the member 12, and a second sleeve 20 is slidably mounted within the bushing and through the member 21 and packing ring 22. Said sleeve 20 forms a part of the flushing valve whose structure *per se* forms the subject matter of the present invention.

A valve stem 23 carries a pair of valve members 24 and 25 coöperating with seats 26 and 27 respectively to control the flow of water into the pressure tank and from there into the bowl. Said valve stem 23 is formed with an enlarged and screw-threaded portion 28. It is adjustably secured within the threaded sleeve 20, and said portion 28 is constructed, as at 29, to receive a suitable tool, *e. g.*, a screw driver or the like for adjusting said valves 24 and 25 with relation to their respective seats.

A screw bolt 30 forming a contact member is fitted in one end of the sleeve 20, and has formed thereon a pin or central projection 31 that is provided with a spring 32, whose other end engages with the head 28 of the valve stem and holds the same under sufficient tension to prevent displacement of the valve through the working of the system.

The valve 25 is normally maintained seated through the action of the spring 33, and is displaced, and the valve 24 seated through the lever arm 34. Said arm 34 is formed continuous with the hinge 35 of the seat 2, that engages with the head or contact part of the screw bolt 30, as will be understood.

It will be evident from the foregoing that either of the valves 24 or 25 may be adjusted with respect to its seat by merely removing the screw bolt 30 carrying spring 32 and giving access to the head 28 of the valve stem 23 for engagement by a screw driver or similar tool for turning said head.

It is obvious that those skilled in the art may vary the details of construction and arrangement of parts without departing from the spirit of my invention, and therefore I do not wish to be limited to such features except as may be required by the claims.

Having thus fully described my said in- vention, what I claim as new and desire to secure by Letters Patent, is:

1. In a flushing valve the combination of a casing having a valve seat, a tubular member reciprocally mounted in the casing, a valve member, a stem on said valve member having screw-threaded adjustment in the tubular member and adapted to be adjusted by an instrument inserted in the tubular member and a contact member closing the end of said tube, substantially as set forth.

2. In a flushing valve the combination of a casing having a valve seat, a tubular member reciprocally mounted in the casing, a valve member having a stem adjustably mounted in the tubular member and adapted to be adjusted by an instrument inserted in the tubular member, and a tensioning device engaging with the valve stem, substantially as set forth.

3. In a flushing valve the combination of a casing having a valve seat, a tubular member reciprocally mounted in the casing, a valve member having a stem adjustably mounted in the tubular member, a plug secured to the tubular member, and a tensioning member between said plug and the valve stem, substantially as set forth.

4. In a flushing valve the combination of a casing having a valve seat, a tubular member reciprocally mounted in the casing, a valve member having a stem screw-threaded in the tubular member, a plug secured to the tubular member, and a valve tensioning spring interposed between said plug and the valve stem, substantially as set forth.

5. In a flushing valve the combination of a casing having a valve seat, a tubular member reciprocally mounted in the casing, a valve member, a stem on the valve member constructed with a threaded head portion adjustably mounted in the tubular member, a plug screw-threaded in the tubular member, and a valve tensioning spring interposed between said plug and the valve stem, substantially as set forth.

6. In a flushing valve the combination of a casing having a valve seat, an internally screw-threaded tubular member reciprocally mounted in the casing, a valve member, a stem on the valve member having a head screw-threaded in the tubular member, said head constructed with a notch to receive a tool for adjusting the valve member; a plug screw-threaded in the tubular member and forming an abutment, said plug having a projecting pin portion; and a valve tensioning spring mounted on said pin and engaging with the head of the valve stem, substantially as set forth.

7. In a valve for flushing systems, the combination of a casing having two opposed valve seats, a tubular member reciprocally mounted in the casing, valve members for said valve seats respectively, a stem on the valve members having a head screw-threaded in the tubular member, a spring acting to normally seat one of said valves, said head constructed to receive a tool for adjusting the valve members, a plug screw-threaded in the tubular member and forming an abutment, and a valve tensioning spring disposed between said head and the abutment, substantially as set forth.

In witness whereof, I have hereunto set my hand and seal at Washington, District of Columbia, this sixteenth day of September, A. D. nineteen hundred and sixteen.

HARRY L. KELLY. [L. S.]

Witnesses:
H. H. BYRNE,
C. S. CLEMENTS.

Copies of this patent may be obtained for five cents each, by addressing the "Commissioner of Patents, Washington, D. C."